United States Patent
Peck

(10) Patent No.: US 7,114,414 B1
(45) Date of Patent: Oct. 3, 2006

(54) TOOL FOR ADJUSTING RIMLESS EYEWEAR

(75) Inventor: Cynthia L. Peck, Mansfield, MA (US)

(73) Assignee: The Hilsinger Company, Plainville, MA (US)

( * ) Notice: Subject to any disclaimer, the term of this patent is extended or adjusted under 35 U.S.C. 154(b) by 0 days.

(21) Appl. No.: 11/424,641

(22) Filed: Jun. 16, 2006

Related U.S. Application Data

(63) Continuation of application No. 11/043,295, filed on Jan. 26, 2005.

(60) Provisional application No. 60/545,568, filed on Feb. 18, 2004.

(51) Int. Cl.
B25B 7/02 (2006.01)
G02C 13/00 (2006.01)

(52) U.S. Cl. .................. 81/3.6; 81/418; 81/426.5

(58) Field of Classification Search .............. 81/3.6, 81/418, 424, 424.5, 426.5, 185.1, 186
See application file for complete search history.

(56) References Cited

U.S. PATENT DOCUMENTS

| | | |
|---|---|---|
| 0,949,413 A | 2/1910 | Chappel |
| 1,746,016 A | 2/1930 | Shiffman et al. |
| 2,439,501 A | 4/1948 | Yelkin |
| 2,523,649 A | 9/1950 | Delorey |
| 2,842,997 A * | 7/1958 | Wentling ............... 81/418 |
| 2,845,997 A | 7/1958 | Wentling |
| 3,145,388 A | 8/1964 | Carpinella |
| 3,503,397 A * | 3/1970 | Raible et al. ............ 606/207 |
| 4,821,610 A | 4/1989 | Redmon et al. |
| 5,181,500 A | 1/1993 | Chamberland |
| 5,423,236 A | 6/1995 | Bickler |
| 5,485,770 A | 1/1996 | Popelak |
| 5,735,857 A | 4/1998 | Lane |
| 6,240,815 B1 | 6/2001 | Huang |
| 6,592,219 B1 | 7/2003 | Tsai |

FOREIGN PATENT DOCUMENTS

| | | | |
|---|---|---|---|
| JP | 2002172565 A * | 6/2002 | |
| WO | 03027758 A2 | 4/2003 | |

* cited by examiner

*Primary Examiner*—David B. Thomas
(74) *Attorney, Agent, or Firm*—Barlow, Josephs & Holmes, Ltd.

(57) ABSTRACT

A tool (10) for facilitating the adjustment of rimless eyewear (100) includes two pivotaby connected arms (12, 14) having distal and proximal ends (16, 18). The distal ends (16, 18) of the arms (12, 14) each has a gripping pad (22, 24) attached thereto. The first gripping pad (22) has a seat formed thereon to accommodate a nut, post (113, 114) or other hardware of the eyewear (100). The tool (10) is used to adjust the eyewear (100) by gripping the lens (102, 104) over and around the interface (113, 114) between the lens (102, 104) and the hardware (106, 108, 110) such that the lens (102, 104) and the interface (113, 114) are securely held in their relative positions to one another. Adjustments to the hardware (106, 108, 110) can be made without damaging the lens (102, 104) or the hardware thereon.

15 Claims, 6 Drawing Sheets

TOOL FOR ADJUSTING RIMLESS EYEWEAR

CROSS-REFERENCE TO RELATED APPLICATION

This application is a continuation of U.S. patent application Ser. No. 11/043,295, filed on Jan. 26, 2005, which claims priority to earlier filed U.S. Provisional Application Ser. No. 60/545,568 filed Feb. 18, 2004, the contents of which are incorporated herein by reference.

BACKGROUND OF THE INVENTION

The present invention generally relates to eyewear, such as rimless eyewear. More specifically, the present invention relates to a tool for facilitating the adjustment of rimless eyewear. These tools are commonly known as "adjusting pliers."

Rimless eyewear is very well known in the art. Such rimless eyewear necessitates that the hardware (e.g. temples, hinges, bridge, etc.) be attached directly to the lens using, for example, rivets, clips, posts and the like. Once the hardware is installed, there is a need to adjust various parts of rimless eyewear to custom fit it to the wearer. In the prior art, the rimless frames are typically gripped and twisted and bent by hand to achieve the desired location of the parts of the eyewear. Such bending and twisting places significant pressure and strain on the lens, particularly in the region where the hardware is installed. For example, the lens about the hardware holes is particularly susceptible to cracks and damage during this custom adjustment of the lenses.

Therefore, there is a need to be able to effectively grip rimless frames while they are being adjusted to avoid damage to the hardware or the lenses. Various attempts in the prior art have tried to grip and capture the lens itself about the hardware holes to take the pressure and strain off of the lens in this area and improve the precision of adjustment over simply adjusting the eyewear by hand. Typically, these prior art tools are in the form of adjusting pliers where one side of the tool includes a plastic pad with the other side of the tool being a metal pronged fork-like structure to communicate with the lens on opposing sides of the hardware and their associated holes. However, these prior art tools cannot easily accommodate lenses of differing sizes and shapes and the metal fork-like structure can easily damage the lenses.

SUMMARY OF THE INVENTION

The present invention overcomes the limitations of the prior art and provides a greatly improved tool for facilitating the adjustment of rimless eyewear. Specifically, the improved tool includes a pair of resilient gripping pads that gently communicate with the rimless hardware in the area that it is mounted to the lenses. One gripping pad is preferably of a self-adjusting rocking-type that pivots about a screw. This enables the pad to change angles to accommodate a wide range of lens sizes and shapes. A pair of perpendicularly opposed grooves is provided to receive installed hardware during gripping. The perpendicularly opposed grooves enable the lens to be gripped from different angles. The second pad also includes a pair of perpendicularly opposed grooves to accommodate hardware but also includes a central bore to accommodate a screw, threaded post or nut during use of the tool in the event such hardware is present on the eyewear. This second pad may also be of the rocking-type to provide a more customized clamping grip during adjustment.

In view of the above, a new and novel tool for facilitating adjustment of rimless eyewear is provided. The adjusting pliers of the present invention provides two pads where at least one of them can pivot to accommodate lenses and frame hardware of different sizes and shapes. As a result, this new tool can more effectively grip a rimless frame during adjustment than prior art adjusting pliers by better embracing the lens in the region where the rimless hardware is attached to effectively avoid damage to the lens or hardware installed thereon.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
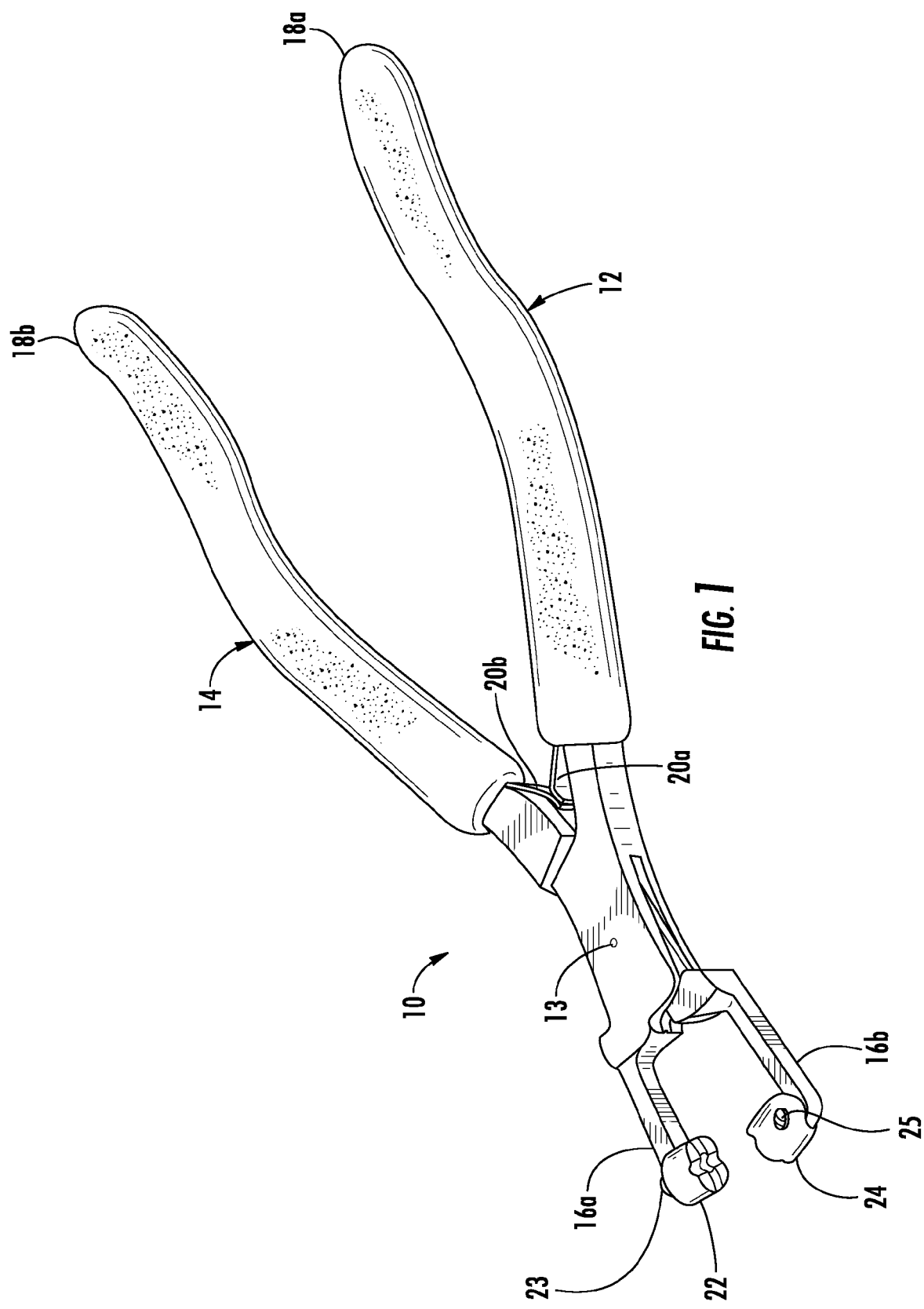
FIG. 1 is a perspective view of the preferred embodiment of the instant invention.

The preferred embodiment of the eyewear adjustment tool of the instant invention is shown generally in FIG. 1 at 10. The tool 10 has a first arm 12 and a second arm 14. The first arm 12 has a distal end 16a a proximal end 18a. Similarly, the second arm 14 also has a distal end 16b and a proximal end 18b. The arms 12, 14 are pivotably connected together by a pivot pin 13 to allow the distal end 16a of the first arm 12 and the distal end 16b of the second arm 14 to move towards each other to a closed position and away from each other to an open position. Preferably, the arms 12, 14 of the tool 10 are pivotably connected at a point that is aligned with the distal 16a, 16b and proximal 18a, 18b ends of the arms 12, 14 to reduce lateral twisting forces as the tool 10 is operated to the closed position. The use of a pivot pin 13 that passes through arms 12 and 14 is just one of many different structures to pivotably connect arms 12 and 14 to each other. Other pivot connection structures may be employed in the tool 10 of the present invention. Preferably the arms 12 and 14 are made of steel, but can be made of any other suitable material for hand tools of this kind.

The proximal ends 18a, 18b of the tool 10 form handles in which an optometrist or optician holds to operate the tool 10. The proximal ends 18a, 18b of the arms 12, 14 may be coated with a rubber or plastic coating to improve the quality and comfort of the optometrist's or optician's grip.

Located on the facing surfaces of the proximal ends 18a, 18b of the arms 12, 14 are a pair of opposing leaf springs 20a, 20b. The leaf springs 20a, 20b exert outward pressure, which forces the distal ends 16a, 16b of the arms 12, 14 apart and to the open position. Although leaf springs are shown, other mechanical springs could be used to achieve the desired spring-bias effect. Alternatively, springs 20a and 20b can be omitted.

Attached to the distal end 16a of the first arm 12 is a first gripping pad 22 with a contact surface 29 thereon. The first gripping pas 22 is preferably mounted in a fixed position on the distal end 16a of the first arm 12. Fastener 23, such as a screw, is employed to secure gripping pad 22 to the distal end 16a.

Figure 7:
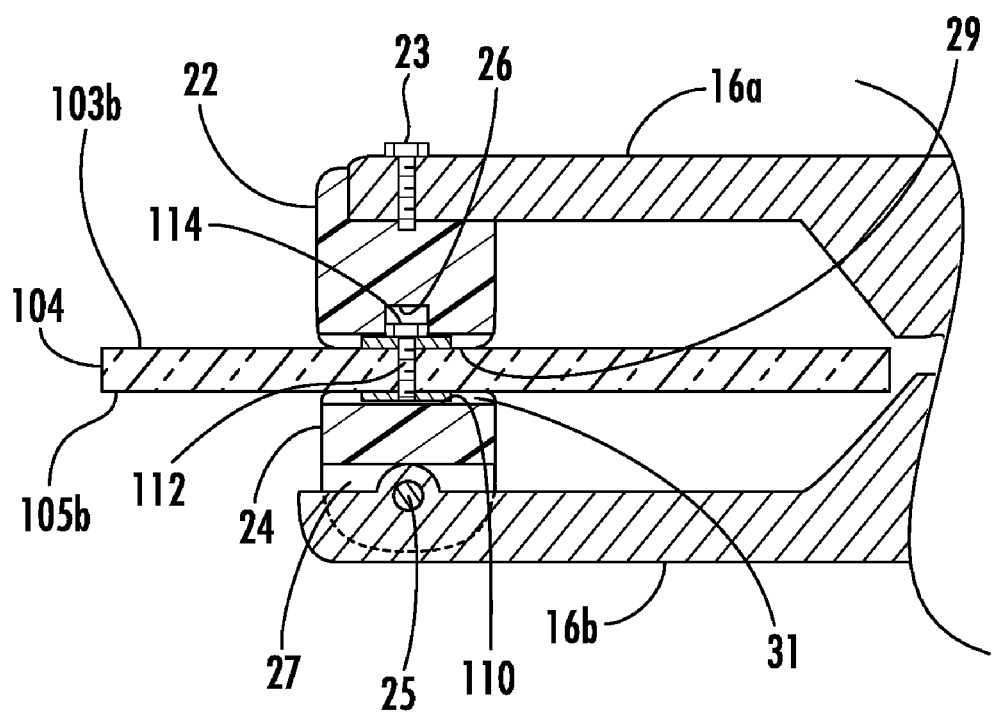
FIG. 7 is a cross-sectional view through the line 6—6 of FIG. 6 showing the instant invention gripping the lens of the rimless eyewear.

Attached to the distal end 16b of the second arm 14 is a second gripping pad 24 with a contact surface 31 thereon. The second gripping pad 24 is preferably pivotably mounted to the distal end 16a of the arm 14 such that the second gripping pad 24 may be pivoted approximately fifteen degrees forwards and backwards to facilitate an even grip on a curved surface of varying thickness such as a lens. A fastener 25, such a screw or rivet, pivotably secures gripping pad 24 to distal end 16b. As can be seen in FIG. 7, a gap 27 is provided within gripping pad 24 to permit it to pivot about fastener 25.

While it is preferred that gripping pad 22 is fixed and gripping pad 24 is pivotably mounted, it is possible that both pads 22 and 24 are both fixed. Alternatively, both pads 22 and 24 can be pivotably mounted. The pads 22, 24 are preferably made of a soft nylon material, but may be constructed of any other material that is cushioning or will not damage the lenses 102 and 104 in FIGS. 4 and 5.

The optician or optometrist operates the tool 10 by squeezing the proximal ends 18a, 18b of the arms 12, 14 with enough pressure to overcome the outward force exerted by the leaf springs 20a, 20b to cause the distal ends 16a, 16b of the arms 12, 14 to travel to the closed position. Depending on the amount of force exerted by the optician or optometrist against the proximal ends 18a, 18b of the tool 10, he or she may control the amount of force exerted by the gripping pads 22, 24.

Figure 2:
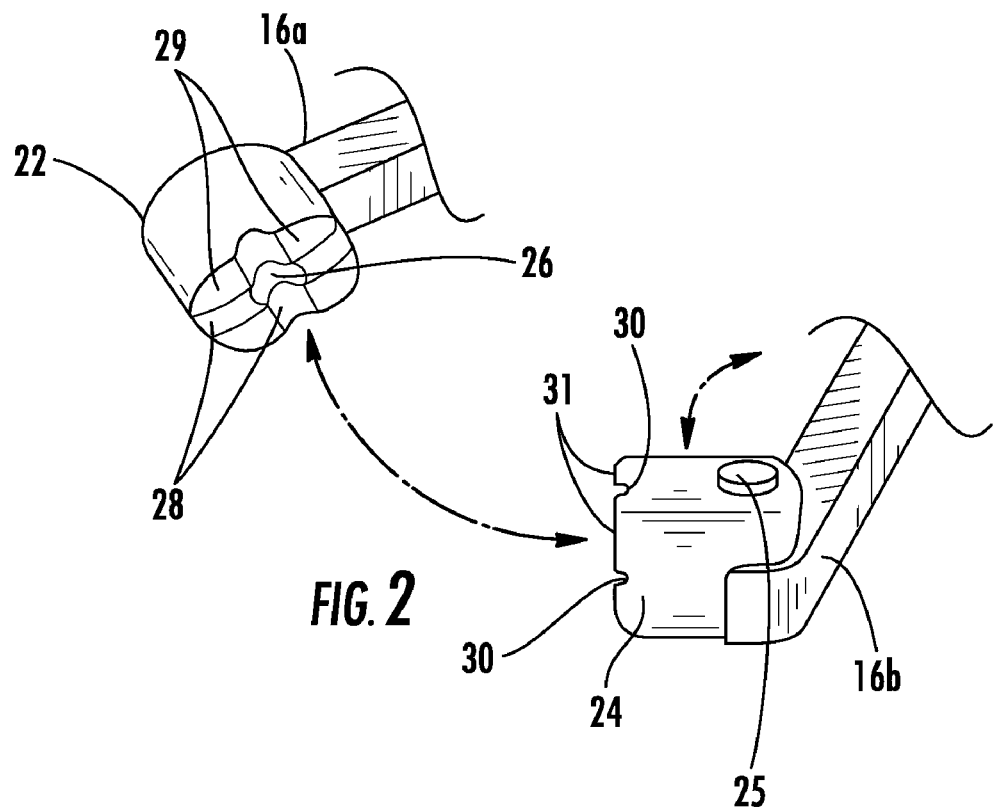
FIG. 2 is a top close-up perspective view of the preferred embodiment of the gripping pads of the instant invention.

Referring now to FIG. 2, a close up view of the first gripping pad 22 of the tool 10 of the instant invention is shown. The first gripping pad 22 uniquely includes a central bore which forms a seat 26, which can be clearly seen in FIG. 7. The seat 26 is designed to accommodate a retaining component of a pair of rimless eyewear described more fully below. Also included, are a pair of perpendicularly opposed grooves 28 designed to accommodate a fastening structure of rimless eyewear described more fully below. Contact surface 29 gently communicates with a lens, as will be described below.

Figure 3:
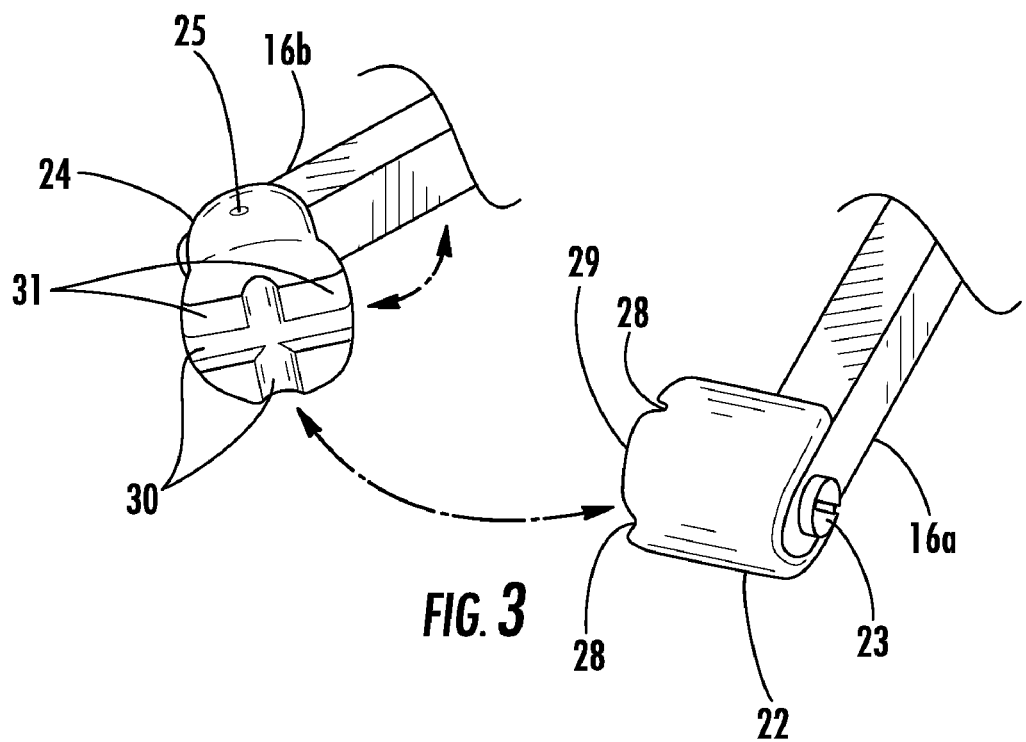
FIG. 3 is a bottom close-up perspective view of the preferred embodiment of the gripping pads of the instant invention.

Referring now to FIG. 3, a close up view of the second gripping pad 24 of the tool 10 of the instant invention is shown. The second gripping pad 24 also includes a pair of similarly configured perpendicularly opposed grooves 30 as the first gripping pad 22. These grooves 30 serve the same function as the grooves 28 on the first gripping pad 22. Contact surface 31 gently communicates with a lens, as will be described below.

Figure 4:
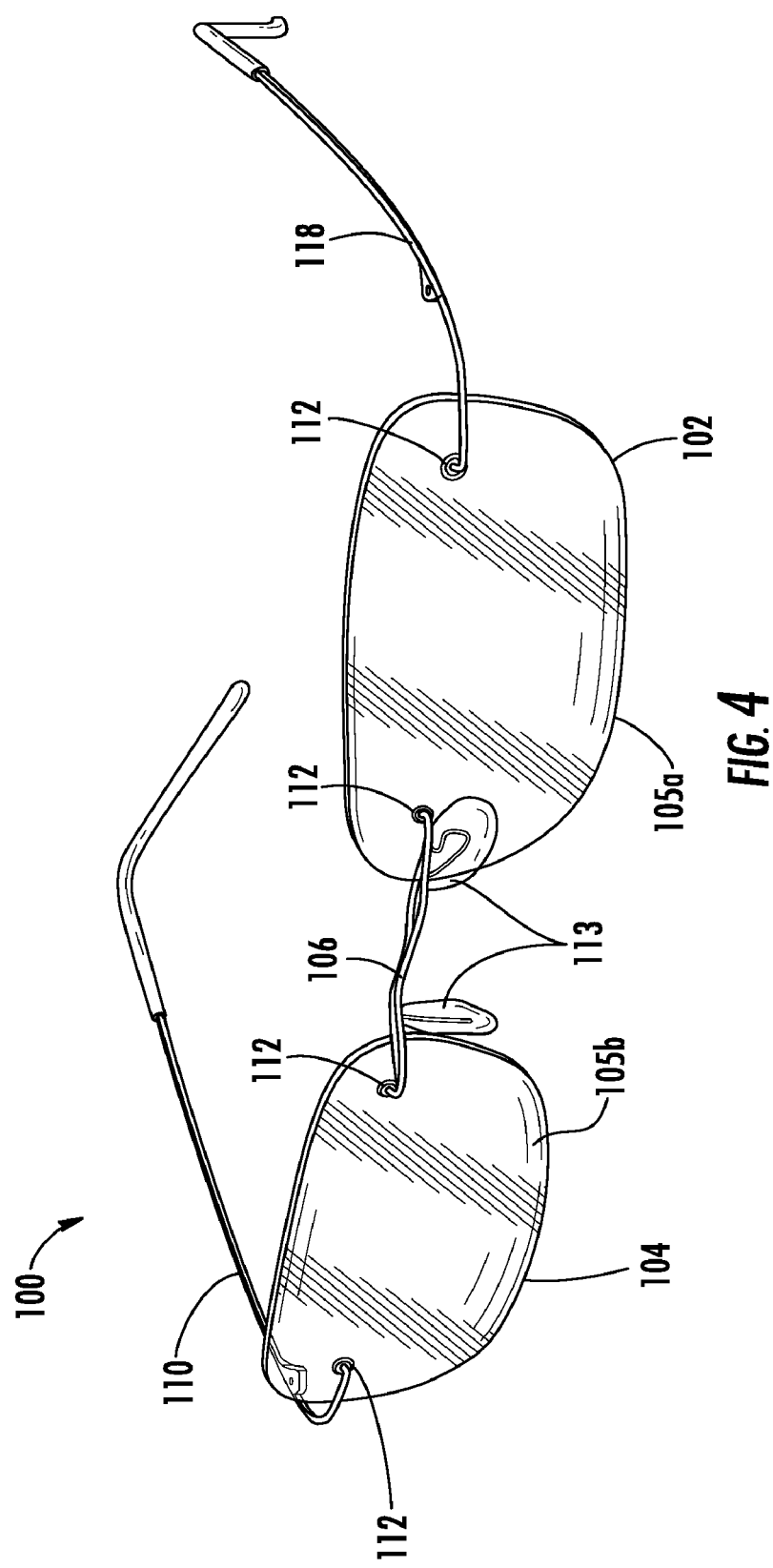
FIG. 4 is a front perspective view of a pair of rimless eyewear with various hardware installed thereon.
Figure 5:
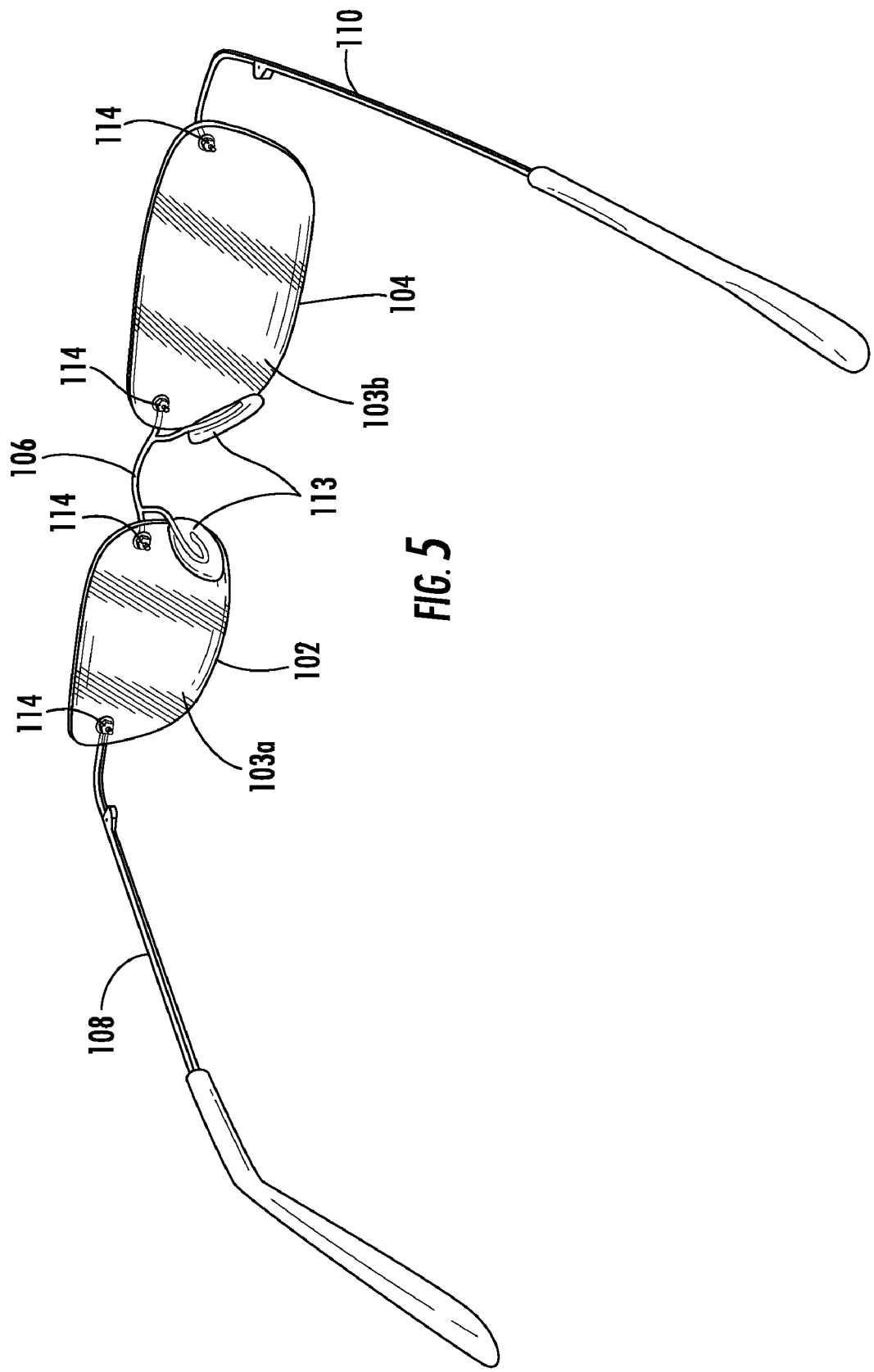
FIG. 5 is a rear perspective view of the pair of rimless eyewear of FIG. 4.

Referring now to FIGS. 4 and 5, a pair of common rimless eyewear is shown generally at 100. These figures are provided in order to describe the method of using the novel tool 10 of the present invention. A pair of rimless eyewear 100 includes a left lens 102 and a right lens 104. The lenses 102, 104, which can be made of polycarbonate material or glass, for example, have corresponding inside surfaces 103a, 103b, and outside surfaces 105a, 105b. Unlike traditional eyewear (not shown), rimless eyewear 100 lacks a frame surrounding and holding the lenses 102, 104. The lenses 102, 104 are connected together by a bridge wire 106 with typical nose pads 113 thereon. On the other sides of the lenses 102, 104, opposite from the sides the bridge wire 106 is connected, are a corresponding left temple bar 108 and right temple bar 110.

Because a pair of rimless eyewear lack a traditional frame in which to attach the bridge wire 106 and temple bars 108, 110, these components 106, 108, 110 are attached directly to the lenses 102, 104 typically through a hole punched, molded or drilled through the edge of the lens 102, 104. These components 106, 108, 110 may then be attached to the lens 102, 104 by a number of means, but one common means implemented is a post 112 (seen more clearly in FIG. 7) with a threaded top and nut 114 threaded thereon to secure these components 106, 108, 110 to the lenses 102, 104. Although the post-and-nut style means is shown, the tool of the instant invention can accommodate other configurations that use a post and a retaining back component such as a rivet or a notched post with a plastic clasp.

Figure 6:
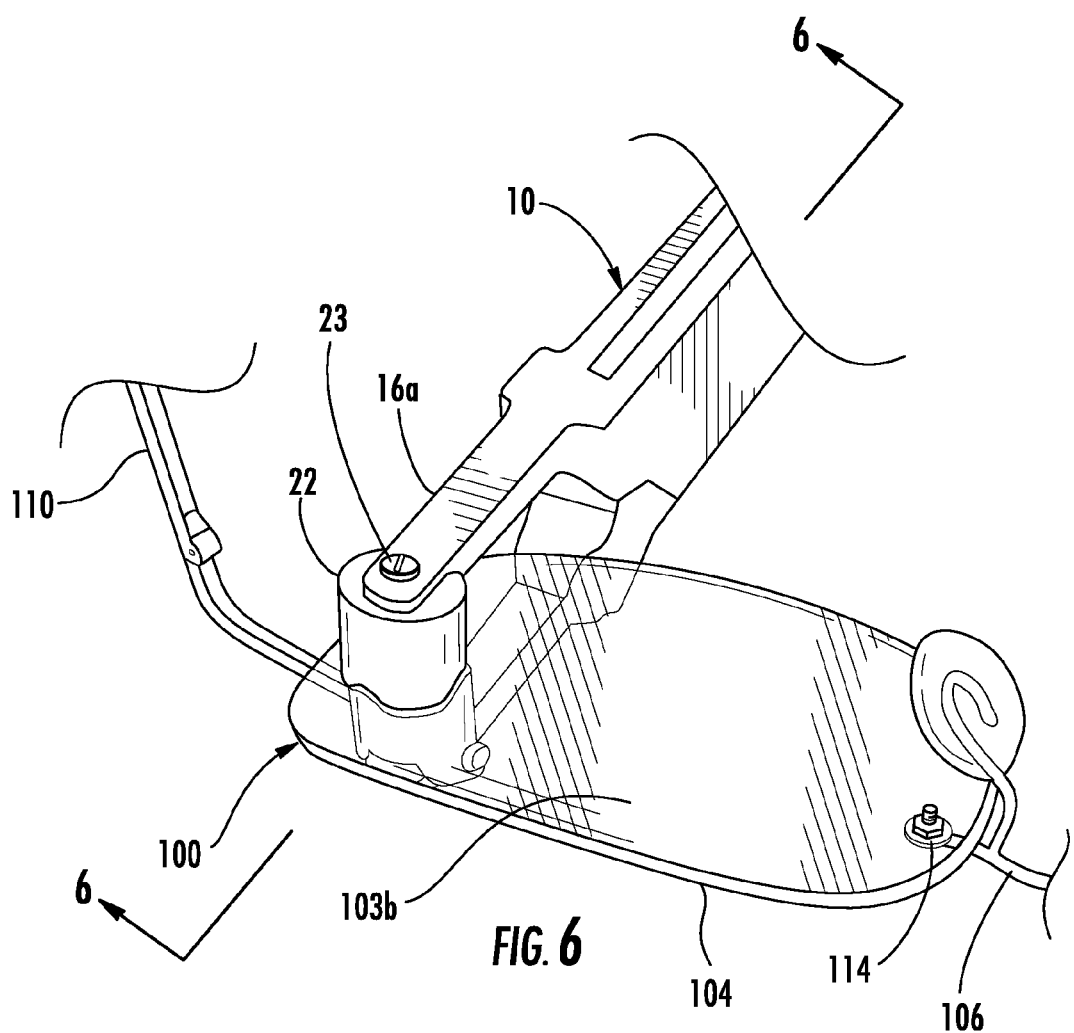
FIG. 6 is a perspective view of the instant invention gripping a lens of the rimless eyewear of FIG. 4.

Referring now to FIGS. 6 and 7, use of the unique tool 10 the instant invention is shown. As can be seen, and by way of example, the tool 10 is used to grip a pair of rimless eyewear 100 on the lenses 102, 104 at a point where the temple bars 108, 110 are joined. Although the figures and description will be described in reference to the right lens 104 and right temple bar 110, this procedure is equally applicable to the joint created by the left temple bar 108 and the left lens 102 and the joints created between the bridge wire 106 and both lenses 102, 104. The description is limited to a discussion of the method of gripping the joint created by the right lens 104 and right temple bar 110 solely as a matter of convenience to the reader and to avoid redundancy.

The tool 10 is orientated so that the seat 26 of the first gripping pad 22 is placed over the nut 114 of the eyewear 100. The tool 10 may then further be orientated so that the grooves 28 interlock with the portion of the right temple bar 110 that may protrude onto the inside surface 103b of the lens 104. The optician or optometrist will then operate the tool 10 to the closed position to close the distal ends 18a, 18b and attached gripping pads 22, 24 against the right lens 104 so that the contact surfaces 29 and 31 of the respective gripping pads 22, 24 engage the lens 104. The groove 30 of the second gripping pad is aligned by the optician or optometrist to mate with the portion of the right temple bar 110 that may protrude onto the outside surfaces 105b of the lens 104.

The optician or optometrist then exerts enough pressure such that the tool 10 securely holds the post 112, nut 114, and right lens 104 in relative relation to one another. Because the seat 26 envelopes the nut 114, and the grooves 28, 30 envelope the portion of the right temple bar 110 that overlaps the right lens 104, the region at the lens 104 immediately about the hardware, namely the post 112 and nut 114, is firmly gripped. As a result, the right temple bar 110 may then be adjusted without fear of cracking the right lens 104. The nylon or other material of the pads 22, 24 is desired so the delicate lenses 102, 104 are not damaged during eyewear adjustment using the tool 10 of the present invention.

Although the description has been described in considerable detail regarding a certain preferred embodiment, other versions are possible. All the features disclosed in this specification (including the accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A tool for facilitating the adjustment of rimless eyewear having a lens and hardware thereon, the hardware being connected to the lens at an interface point on the lens, comprising:
   a first arm having a distal end and a proximal end;
   a first resilient gripping pad attached to the distal end of the first arm, the first resilient gripping pad having a gripping surface configured and arranged to contact the lens of the rimless eyewear at the interface point over and around the hardware;
   a second arm pivotably connected to the first arm and having a distal end and a proximal end;
   a second resilient gripping pad attached to the distal end of the second arm, said second resilient gripping pad having a gripping surface thereon;
   whereby the first gripping pad and the second gripping pad grip the lens about the hardware at the interface point between the gripping surface of the first gripping pad and the gripping surface of the second gripping pad for precise damage-free adjustment of the eyewear in which the lens is installed.

2. The tool of claim 1, further comprising means for spring-biasing the first arm relative to the second arm.

3. The tool of claim 1, wherein the first gripping pad is pivotably attached to the distal end of the first arm.

4. The tool of claim 1, further comprising a first groove on the gripping surface of the first resilient gripping pad.

5. The tool of claim 4, further comprising a second groove on the gripping surface of the first resilient gripping pad.

6. The tool of claim 1, wherein the gripping surface of the first resilient gripping pad further includes a seat for receiving eyewear hardware thereon.

7. The tool of claim 1, further comprising a first groove on the gripping surface of the second resilient gripping pad.

8. The tool of claim 7, further comprising a second groove on the gripping surface of the second gripping pad.

9. A tool for facilitating the adjustment of rimless eyewear having a lens and hardware thereon, the hardware being connected to the lens at an interface point on the lens, comprising:
   a first arm having a distal end and a proximal end;
   a first resilient gripping pad attached to the distal end the first arm; the first resilient gripping pad having a gripping surface with a recessed surface defining a hardware-receiving seat therein, said seat configured and arranged to be placed over and around the hardware at the interface point in the lens;
   a second arm having a distal end and a proximal end;
   a second resilient gripping pad pivotably attached to the distal ends of the second arm, said second resilient gripping pad having a gripping surface thereon; and
   the first arm and second arm pivotably connected together wherein the distal end of the first arm and distal end of the second arm are movable between a closed position embracing the lens and hardware thereon between the gripping surface of the first gripping pad and the gripping surface of the second gripping pad and an open position.

10. The tool of claim 9, further comprising means for spring-biasing the distal end of the first arm away from the distal end of the second arm.

11. The tool of claim 9, further comprising a first groove on the gripping surface of the first resilient gripping pad.

12. The tool of claim 11, further comprising a second groove on the gripping surface of the first resilient gripping pad.

13. The tool of claims 9, further comprising a first groove on the gripping surface of the second resilient gripping pad.

14. The tool of claim 13, further comprising a second groove on the gripping surface of the second resilient gripping pad.

15. A tool for facilitating the adjustment of rimless eyewear having a lens and hardware thereon, the hardware being connected to the lens at an interface point on the lens, comprising:
   a first arm having a distal end and a proximal end;
   a first resilient gripping pad attached to the distal end the first arm; the first resilient gripping pad having a gripping surface with a recessed surface defining a hardware-receiving seat therein and a pair of grooves perpendicularly offset from each other, said seat configured and arranged to be placed over and around the hardware at the interface point in the lens;
   a second arm having a distal end and a proximal end;
   a second resilient gripping pad pivotably attached to the distal ends of the second arm, said second resilient gripping pad having a gripping surface with a pair of grooves formed thereon perpendicularly offset from one another;
   the first arm and second arm pivotably connected together wherein the distal end of the first arm and distal end of the second arm are movable between a closed position embracing the lens and hardware thereon between the gripping surface of the first gripping pad and gripping surface of the second gripping pad and an open position; and
   means for spring-biasing the first arm and the second arm to the open position.

* * * * *